United States Patent Office 3,464,788
Patented Sept. 2, 1969

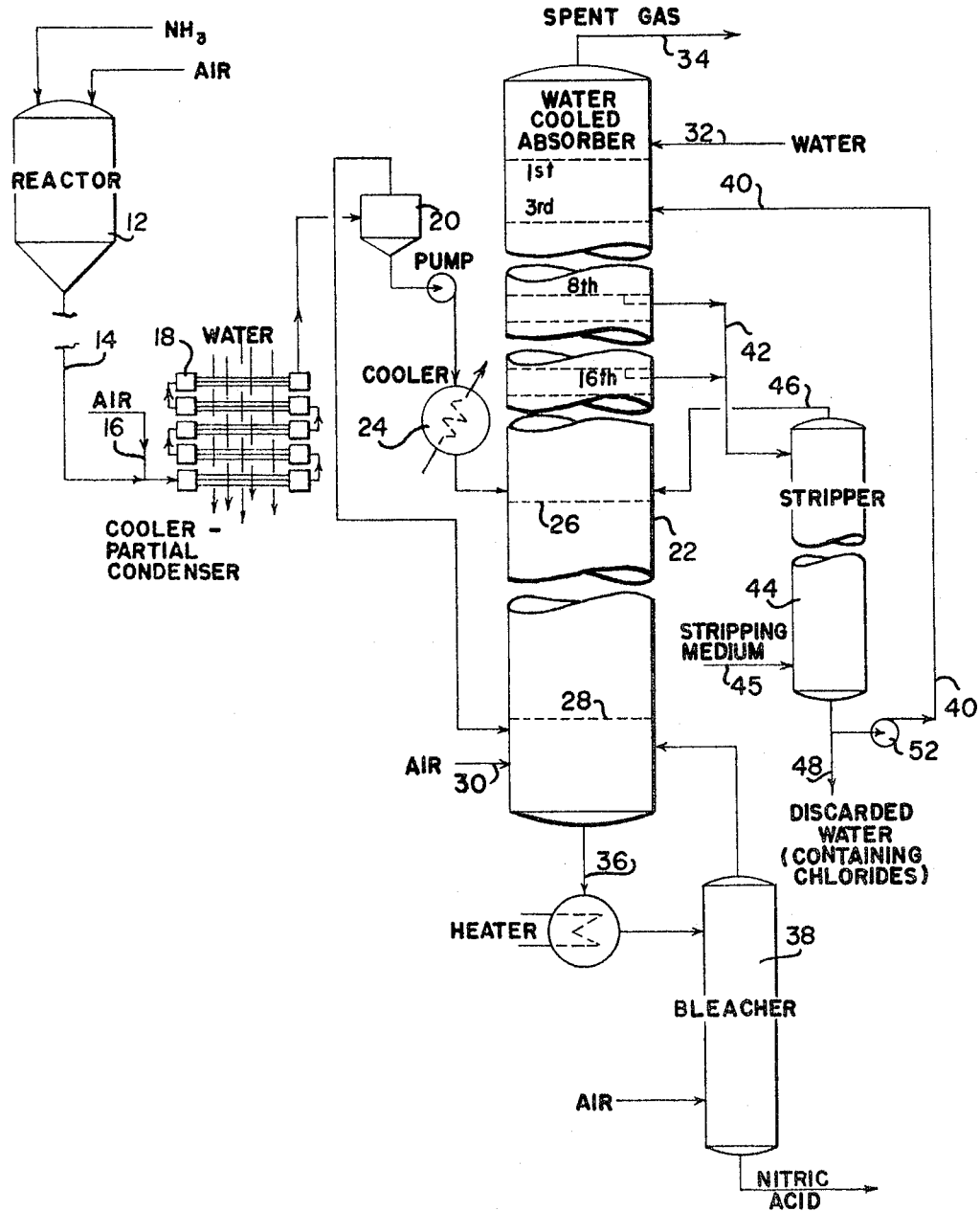

3,464,788
PROCESS AND APPARATUS FOR PRODUCTION
OF NITRIC ACID
Henry N. La Croix, East Orange, N.J., assignor to Foster
Wheeler Corporation, New York, N.Y., a corporation
of New York
Filed Dec. 15, 1965, Ser. No. 513,937
Int. Cl. C01b 21/38
U.S. Cl. 23—162                                    6 Claims

ABSTRACT OF THE DISCLOSURE

A process for production of nitric acid with the steps of: reacting ammonia and air to produce an effluent of essentially water, nitric oxide and other oxides of nitrogen and unreacted air; cooling the effluent in an initial cooling step only to a temperature in the range of 140° F. to 170° F.; separating a liquid phase and a gaseous phase from the effluent; charging the gaseous phase immediately within the bottom of a vertical multiple tray pressurized absorption tower at said range of 140° F. to 170° F. for countercurrent flow with water introduced at the top of the tower at a temperature of about 68° F. to 100° F.; further cooling the liquid phase to about 100° F; charging the liquid phase to about said 100° F. temperature within the central portion of said tower wherein said tower is at an elevated pressure and acid strength matching the strength of the liquid phase and recycling a substantially increased amount of water to the top trays of the tower, withdrawing approximately the same increased amount of water several trays further down of the vertical tower and passing said recycled water through a stripper where the oxides of nitrogen are stripped.

---

This invention relates to a process and apparatus for the production of nitric acid, and in particular to a method and apparatus for obtaining increased strength nitric acid from oxidation of ammonia.

In the manufacture of nitric acid in strengths up to perhaps 58%, it is known to oxidize ammonia catalytically with air, cool the effluent gases with condensation of the water formed during combustion, and oxidize nitric oxide (NO) to nitrogen dioxide ($NO_2$). Following cooling, the nitrogen dioxide is subjected to aqueous absorption accompanied by chemical reactions which produce nitric acid.

Although various phases of the process have been extensively studied by others, tradition apparently has dictated that the absorber be operated at as low a temperature as possible, usually that obtainable with ordinary cooling water, and within the range of about 68° F. to 100° F. at the top of the tower to slightly over 100° F. at the bottom of the tower. Accordingly, it is conventional in the cooling step prior to absorption to cool the converter effluent to a temperature in the order of 100° F., separate condensed weak nitric acid from the effluent and then introduce the latter into the absorption column near the bottom of the tower. It has even been suggested by some to further cool effluent gas to 86° F. for the purpose of holding down temperatures at the bottom of the tower. The separated weak acid is introduced into the absorption column on a plate or tray, generally in the lower part of the column, which contains nitric acid of about the same strength as that separated from the effluent.

In the absorption column, final cooling and mixing takes place by the use of internally located pipe cooling coils and through bubble caps, Raschig rings or similar contact media with oxidation, polymerization and solution to form nitric acid. An amount of water stoichiometrically required to obtain the concentration of acid desired, at the bottom of the tower, is added at the top of the tower, the water flowing downwardly. Spent gas containing normally 0.3 to 0.4 percent oxides of nitrogen passes out the top of the absorption tower, and the nitric acid product is drawn from the bottom of the tower. One problem is that spent gas, with this concentration of oxides of nitrogen, is frequently considered an atmospheric pollutant. However, in the upper half of the tower, as the concentration of oxides becomes small, absorption of the oxides in the water flowing downwardly becomes difficult with the amount of water available. To add additional water to absorb more oxide only dilutes the acid withdrawn from the bottom of the tower, and the other alternative, enlarging the height of the tower, becomes uneconomical.

It is an object of the invention to overcome these disadvantages and achieve a higher concentration of nitric acid in the stream from the bottom of the tower, with a decrease in the concentration of oxides of nitrogen in the spent gas leaving the top of the tower.

In accordance with the invention, there is provided in a process for the production of nitric acid, which includes the steps of reacting ammonia and air to produce an effluent consisting essentially of water, nitric oxide and other oxides of nitrogen and unreacted air, cooling the effluent in an initial cooling step, separating a liquid phase from the effluent, and charging the liquid and gaseous phases into an absorption tower for countercurrent flow with water, the improvement comprising cooling the reactor effluent only to a temperature in the range of about 140° F. to about 170° F., adding the gaseous phase at the bottom of the tower preferably below the lowermost tray thereof without further cooling but further cooling the liquid phase to about 100° F., and adding it to the absorption column on a tray where the acid strength within the tower reasonably matches the strength of the liquid phase.

Within the tower, a substantially increased amount of water is added to the tower over that normally added, approximately the same amount minus normal flow to the tower being withdrawn several trays further down and passing to a stripper where oxides of nitrogen are stripped from this withdrawn flow. The stripped oxides are reintroduced into the tower at a point further down, and the withdrawn water is recycled to near the top of the tower.

It will become apparent that by adding the gaseous phase of the effluent after preliminary cooling and separation to the absorption tower below the lowermost tray of the tower at a high temperature, that the hot gas tends to evaporate water on the lowermost tray producing a distilled higher strength acid. In addition, the gaseous phase, richer in nitric oxides than normal will tend to produce a higher strength acid, the combined results achieving concentrations as high as 67% acid on a weight basis.

The increased circulation of water in the upper portion of the tower results in a higher absorption of oxides of nitrogen with a lesser concentration of these oxides in the spent gas leaving the top of the tower.

Other advantages and the invention will become apparent upon further consideration of the specification and accompanying drawings which shows a nitric acid process and apparatus incorporating the concepts of the invention.

Referring to the figure, ammonia and air are introduced into a reactor 12 and allowed to flow over a suitable catalyst, for instance a platinum catalyst. The concentration of ammonia in the air ammonia mixture may be within the range of 8 to 10.5 volume percent. Prior to being mixed with ammonia, the air may be preheated.

Other preliminary steps not part of this invention may be undertaken.

In the reactor 12, ammonia is oxidized with air in accordance with the following equation:

$$4NH_3 + 5O_2 \rightarrow 4NO + 6H_2O$$

The reaction is exothermic and will produce an effluent in line 14 consisting essentially of water, nitric oxide, other oxides of nitrogen, and unreacted combustion air, at a temperature in the order of 1500° F. to 1700° F. The effluent undergoes a number of intermediate steps also not part of this invention, with the introduction of heated air in line 16 at which point the effluent enters a condenser 18. The condenser, which may be a series of cooling tubes over which water is flowed to absorb heat an deffect the necessary cooling cools the effluent gases preferably to a temperature in the range of about 140° F. to about 170° F.

The lower temperature (about 140° F.) is the lowermost temperature below which appreciably more nitrogen dioxide and nitric acid are driven into the condensing water, with a corresponding reduction in nitric acid forming constituents in the gas phase. The upper limit of about 170° F. is that at which adequate amounts of water are condensed which water would denude the gas phase.

On being cooled, the nitric oxide in the reaction effluent is oxidized by oxygen present in the effluent in accordance with the equation:

$$2NO + O_2 \rightarrow 2NO_2$$

A substantial proportion of the nitric oxide entering the condenser is oxidized to nitrogen dioxide which reacts with water, also in the reactor effluent, to form liquid nitric acid in accordance with the equation:

$$3NO_2 + H_2O \rightarrow = 2HNO_3 + NO$$

It is noted that this reaction forms additional quantities of nitric oxide required to be oxidized with oxygen to nitrogen dioxide.

Following cooling, the effluent passes to a separator 20 where liquid, consisting essentially of weak nitric acid is withdrawn from the bottom, and a gaseous phase consisting essentially of unreacted air and oxides of nitrogen (NO, NO₂, and N₂O₄ and water vapor) passes off the top. The liquid stream is increased in pressure to the pressure of an absorption tower 22, and further cooled in cooler 24 to a temperature of about 100° F., after which it is admitted into the tower on a tray 26 having an acid strength essentially the same as that of the weak acid stream. The separated hot gas is introduced into the tower, preferably below the lowermost bubble tray or packed bed 28, still at the 140° F. to 170° F. temperature.

In addition to the gas phase of the reactor effluent, oxygen or air is introduced by way of line 30 into the tower for the purpose of oxidation of NO within the tower.

The column 22 is a conventional bubble cap or Raschig ring absorption column containing series of internally located pipe cooling coils and a series of plates or trays, and water is introduced at the top of the column via line 32 at usual tap water temperatures. The water passes down through the column where it reacts with nitrogen dioxide to form nitric acid in countercurrent flow with the oxide gases, and further absorbs the nitric acid thus formed. As the reaction forms some nitric oxide, this is oxidized with the air entering through line 30 to nitrogen dioxide for further reaction with water. The pressure in the tower is about one hundred (100) pounds per square inch, plus or minus twenty (20) pounds, with a gas temperature at the top of the tower about 60° F. and a gas temperature at the bottom about 140 to 170° F. The temperature on the lowermost tray will be below the gas temperature by virtue of the cooling effect of the liquid flowing from the tray above the lowermost tray. Optimizing the invention will depend in part on adjustment of the heat removal capacity of the pipe cooling coils and the cooling effect of the downwardly flowing liquid. Spent gas containing minimum amounts of oxides of nitrogen pass in line 34 from the top of the tower, with the nitric acid product being drawn from the bottom of the tower in line 36.

At the bottom of the tower, the nitric acid product which has a slightly brownish color is removed to a bleaching column 38 and is treated in a conventional manner.

An advantage of the invention should now be apparent. In a conventional unit, cooling in the condenser 18 is usually carried as far as possible, usually less than 100° F., for the purpose of making as much nitric acid as possible in the condenser. Accordingly, the absorption tower is operated, at the bottom, at a temperature of about 100° F. In the present process, cooling in the condenser is cut short at above 140° F., depending on pressure within the absorption tower, and the gaseous effluent is immediately introduced into the tower below the lowermost tray thereof thus maintaining the tower bottom near this temperaure. This has a dual effect. The higher bottom tray temperature drives off more water from the bottom tray increasing the nitric acid concentration on the bottom tray. In addition, the higher concentration of nitric oxides (NO, NO₂, N₂O₄) in the gas phase entering the bottom of the tower, resulting from cutting short the reaction in the condenser, increases the reaction of oxides with free oxygen and effects a higher absorption of oxides in nitric acid on the bottom tray also increasing the nitric acid concentration on the tray.

In an example in accordance with the invention, the liquid phase line from separator 20 may have a flow of two hundred (200) pounds per minute of which one hundred and fifty (150) pounds comprises water and fifty (50) pounds acid and oxides of nitrogen. The gas phase line from the separator to the bottom of the tower may contain one thousand nine hundred and forty-nine (1,949) pounds per minute of which two hundred and fifty-six (256) pounds is nitrogen oxide and fifty (50) pounds acid. This compares with a conventional unit in which the liquid phase at about 100° F. is three hundred and sixty (360) pounds per minute one hundred and sixty (160) pounds of which is water and two hundred (200) acid and oxide. In other words, the ultimate higher temperature of the effluent from the condenser, or less condensation, results in less liquid phase and substantially less acid in the phase, or a higher concentration of oxides in the gaseous phase. For instance, in the conventional unit, the gaseous phase at 100° F. may comprise seventeen hundred and eighty-nine (1,789) pounds per minute, of which one hundred and fifty-six (156) pounds per minute is nitrogen oxide, substantially less than with the present invention.

It is particularly important to note the richness of nitrogen oxide in the gas phase and the increased driving force in the absorption tower which will be achieved by virtue of this richness. In accordance, with this aspect of the invention, the concentration of nitric acid in line 36 may be as high as 67% by weight compared to the conventional concentration of about 58%.

In addition to the usual dilution water charged to the top tray of the absorption column by line 32, which flows downward countercurrent to the ascending nitrogen oxide bearing gas, additional water, perhaps five times as much, is introduced in line 40 somewhat below the usual dilution water in line 32, for instance between trays one and two or trays two and three. This water also passes downward countercurrent to the ascending nitrogen oxide bearing gas, and being much greater in quantity absorbs nitrogen oxide to the extent that the spent gas in line 34 contains perhaps 0.1% oxides of nitrogen or less as compared to a normal 0.3–0.4% oxides of nitrogen in a conventional unit. This has the substantial advantage in addition to improved efficiency for the tower, of removing the spent gas from the classification of an atmospheric pollutant.

A major part of the water, equal to that introduced in line 40, is withdrawn as a side stream (line 42) from a tray further down from lines 32 and 40, perhaps the eighth to sixteenth tray. This side stream is then admitted to the top of a stripper 44 on the top tray thereof, flowing downwardly through a stripping media such as trays, packing, etc. in countercurrent contact with a stripped medium such as steam, oxidation air, or an equally suited gas introduced via line 45. The nitrogen oxides which were present in the absorber side stream are thereby driven from the liquid and passed back to the main absorber via line 46 entering the absorber further down for recovery of the recoverable nitrogen oxides. The main water flow is recycled from the bottom of the stripper in the line 40 by means of pump 52. If the stripping medium is steam, it will condense in the absorber and serve as make-up dilution water and a like amount must be withdrawn from the stripper base in line 48. The use of steam would also require a cooler in recycle 40. If the stripping medium is air, the amount added to the stripper in line 45 is only a small percentage of the combined air introduced into the process in the reactor and upstream of the condenser.

The absorber side-stream (line 42) will also contain a major part of the chlorides which enter the plant with the usual acid dilution water. Such chlorides tend to concentrate in the product acid unless a purge is carried out to discard them. In the present invention, the chlorides having negligible vapor pressure collect in the side-stream, and withdrawal of a portion of this side stream will keep the chlorides at a safe and desired level, without entailing the usual losses of acid resulting from the customary acid purge.

In operation, and as a typical example, a water balance for the unit would be as follows:

TABLE I

| Process stream | Pounds of water per minute |
|---|---|
| Reactor effluent (line 14) | 210 |
| Water (line 32) | 193 |
| Side-stream water (line 40) | 1000 |
| Water withdrawn from bottom (line 36) | 400 |

The added stripper 44 improves the operation and efficiency of the nitric acid process since it permits increasing the amount of water over the upper part of the main absorber within reasonable limits, thereby giving better liquid-to-gas contact in the absorber, without resulting in co-current dilution of the product acid in the bottom of the tower. In fact, it permits even discarding water from the amounts entering with the oxidation air or with the ammonia, so that concentrations higher than those obtainable from the stoichiometry of the feed materials results.

The elimination cycle for chlorides will also improve the resistance of the plant to corrosion due to chloride attack.

Although the invention has been described with reference to particular embodiments, many variations within the spirit and scope of the invention as claimed will be apparent to those skilled in the art.

What is claimed is:

1. A process for the production of nitric acid in a multiple tray elevated pressure water cooled absorption tower
   wherein ammonia and air are reacted to produce an effluent consisting essentially of water, unreacted air, nitric oxides and other oxides of nitrogen, the effluent being cooled and separated into a gaseous phase and a liquid phase introduced into the bottom of the tower and a tray higher up of the tower respectively;
   the improvement comprising the steps of introducing a first amount of water at a temperature range of about 68° F. to 100° F. into the top of the tower approximately equal to that stoichiometrically required to obtain the concentration of acid desired at the bottom of the tower;
   introducing a second amount of water substantially in excess of said first amount of water into the tower a few trays below the top of the tower;
   withdrawing said second amount further down the tower substantially from the central trays and passing it to a separate stripping tower;
   stripping nitrogen oxides from said second amount to produce clean water;
   recycling the clean water to the absorption tower as said second amount and introducing the stripped nitrogen oxides into the tower below the point of withdrawal of said second amount.

2. A process according to claim 1 wherein the temperature of the first and second amounts of water is that of ordinary tap water.

3. A process according to claim 2 wherein said second amount is at least five times as much as said first amount.

4. A process according to claim 3 wherein the second amount is withdrawn from the absorption tower on the eighth to sixteenth trays thereof.

5. The method of claim 4 wherein said greater amount of water is introduced into the tower between the first and third trays thereof.

6. The method of claim 5 wherein the stripping medium in the stripping tower is steam, an amount of water equal to the amount of steam added to the stripping tower being withdrawn from the tower to waste, said amount also containing chlorides concentrated in the tower.

References Cited

UNITED STATES PATENTS

| 3,389,960 | 6/1968 | Miller | 23—160 |
| 1,872,638 | 8/1932 | Hechenbleikner | 23—162 |
| 1,901,816 | 3/1933 | Lüscher | 23—162 XR |
| 1,991,452 | 2/1935 | Fauser | 23—162 |
| 2,018,249 | 10/1935 | Caro et al. | 23—162 |
| 2,088,057 | 7/1937 | Handforth | 23—162 XR |
| 2,568,396 | 9/1951 | James | 23—161 |
| 3,003,851 | 10/1961 | Winn | 23—162 |

OSCAR R. VERTIZ, Primary Examiner

G. O. PETERS, Assistant Examiner

UNITED STATES PATENT OFFICE
CERTIFICATE OF CORRECTION

Patent No. 3,464,788                                                  September 2, 1969

Henry N. La Croix

It is certified that error appears in the above identified patent and that said Letters Patent are hereby corrected as shown below:

Column 3, line 16, "an" should read -- and --; same line 16, "deffect" should read -- effect --. Column 5, line 10, "stripped" should read -- stripping --; line 23, after "cycle" insert -- line --.

Signed and sealed this 15th day of September 1970.

(SEAL)
Attest:

Edward M. Fletcher, Jr.                              WILLIAM E. SCHUYLER, JR.
Attesting Officer                                            Commissioner of Patents